United States Patent Office 3,451,692
Patented June 24, 1969

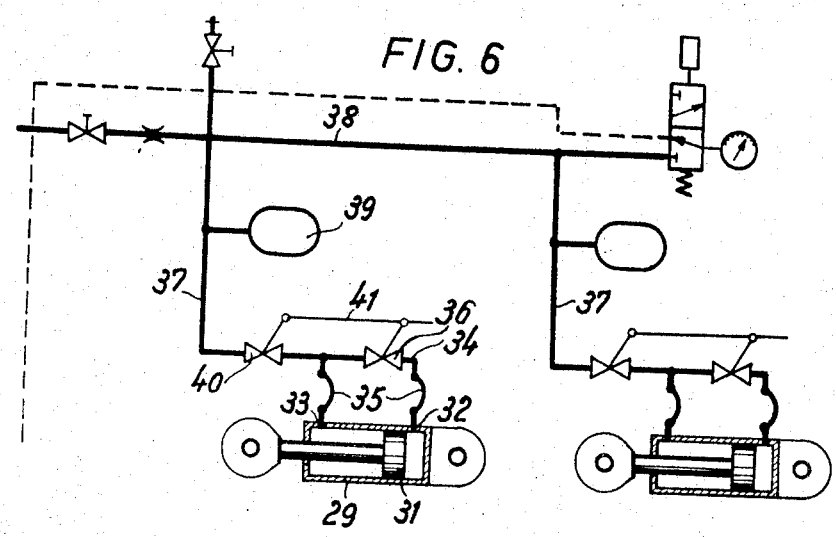
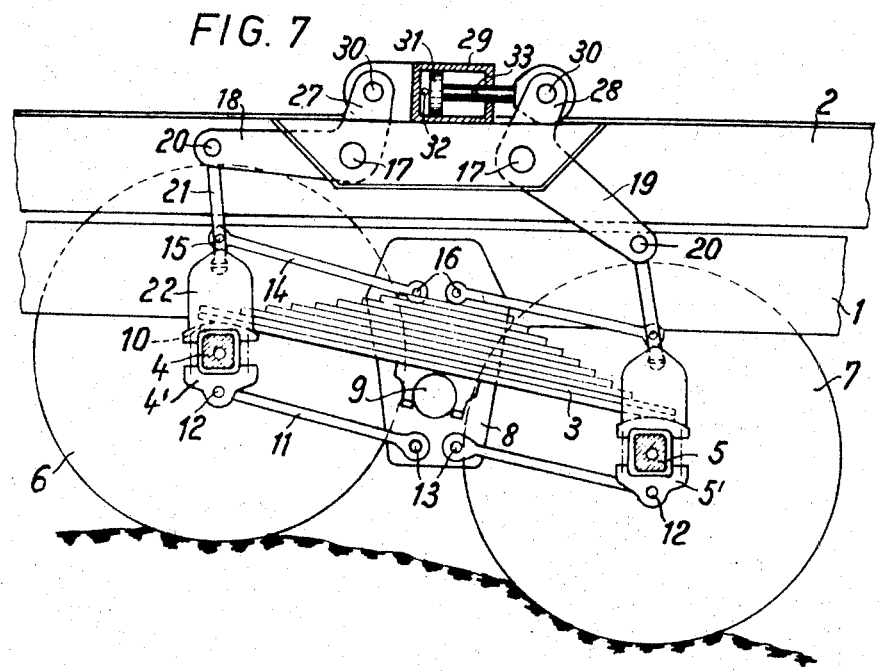

3,451,692
DEVICE FOR HYDRAULICALLY BLOCKING THE SPRING MEANS FOR A CRANE SUPPORTING VEHICLE
Klaus-Friedrich Kappe, Wilhelmshaven, Germany, assignor to Beteiligungs- und Patentverwaltungsgesellschaft mit beschränkter Haftung, Essen, Germany
Filed Jan. 30, 1967, Ser. No. 612,446
Claims priority, application Germany, Feb. 10, 1966, B 85,742
Int. Cl. B60g 11/46, 25/00
U.S. Cl. 280—104.5                    3 Claims

ABSTRACT OF THE DISCLOSURE

The invention concerns an arrangement for hydraulically blocking the springs of a crane supporting vehicle the frame of which is supported by two axles carried by two pairs of wheels on opposite sides of the vehicle. The blocking arrangement comprises primarily two hydraulically operable cylinder-piston systems on opposite sides of the vehicle. The said cylinder-piston systems are by lever systems and linkage means operatively connected to the said pairs of wheels so as selectively to permit the wheels to move independently of each other or to positively link the wheels of each pair of wheels to each other to thereby substantially block the respective spring pertaining to the respective pair of wheels.

---

The present invention concerns a device for hydraulically blocking the spring means of a crane supporting vehicle the frame of which is within the range of the crane structure at both sides supported by two wheel axles through the intervention of springs.

It is an object of the present invention so to design a device of the general type set forth above that also when blocking the springs, it is possible well to adapt the vehicle to the terrain.

It is another object of this invention to provide a device as set forth in the preceding paragraph which will be simple in construction and will be reliable in operation.

These and other objects and advantages of the invention will appear more clearly from the following specification in connection with the accompanying drawings, in which:

FIG. 6 is a diagrammatic illustration of the hydraulic circuit for blocking the spring.

FIG. 7 is a section similar to that of FIG. 3 but of a modification of the invention.

Figure 1:
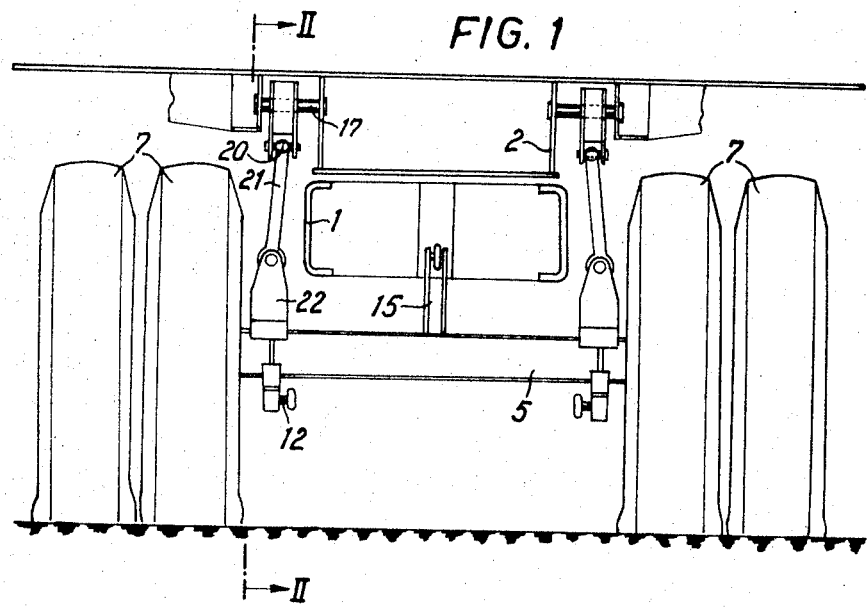
FIG. 1 illustrates a view of the rear portion of a crane supporting vehicle without the crane structure.

The device according to the present invention is characterized primarily in that of two angle levers respectively mounted on each side of the vehicle frame, one leg each rests through the intervention of a stilt or link member upon one of the two wheel axles whereas the other legs of the two angle levers have connected thereto a member, either the piston rod or the cylinder, of a hydraulic cylinder piston system, while both cylinder ends are interconnected through conduit means having interposed therein shut-off valve means.

More specifically, with reference to the drawings, the vehicle frame 1 has mounted thereon a reinforcing frame 2 which is adapted to support a crane structure not shown with the turntable, the operator's cab, and the boom. Within the range below said crane structure, i.e., near the rear end of the vehicle, the vehicle frame 1 rests through the intervention of leaf spring packets 3 located at both sides, upon the two wheel axles 4, 5 which at each end are supported by two wheels 6 and 7 respectively. The transfer of the load from the vehicle frame 1 to the spring packets 3 is effected by means of jaws or plates 8 laterally mounted on frame 1, and also is effected by means of a transverse axle 9 in plates 8. Axle 9 is arranged in the central portion below the spring packets 3 and suspended on said spring packets 3. This is effected in such a way that the spring packets 3 can freely turn about the axis of axle 9. The ends of said spring packets rest on upwardly arched plates 10 which are connected to the wheel axles 4, 5.

The wheel axles 4, 5 are, in a manner known per se and by means of parallelogram systems, so guided on the vehicle frame that they can oscillate upwardly and downwardly. Below each axle 4, 5 and in the vicinity of the ends thereof there are provided two holding members 4′, 5′ to which are respectively linked by bolts 12 two links 11 of the paralellograms. This links or link members 11 are connected to the lower ends of the plates 8 by means of bolts 13. Connected to the central portion of each of the two wheel axles 4, 5 are link members 14. Each link member 14 is pivotally connected to an arm 15 which extends upwardly from the respective axle and on the other hand is journalled by bolts 16 in joints on the vehicle frame. The joint bolts 12, 13, 15, 16 are so arranged that their central portions are located in the corners of parallelograms.

Figure 5:
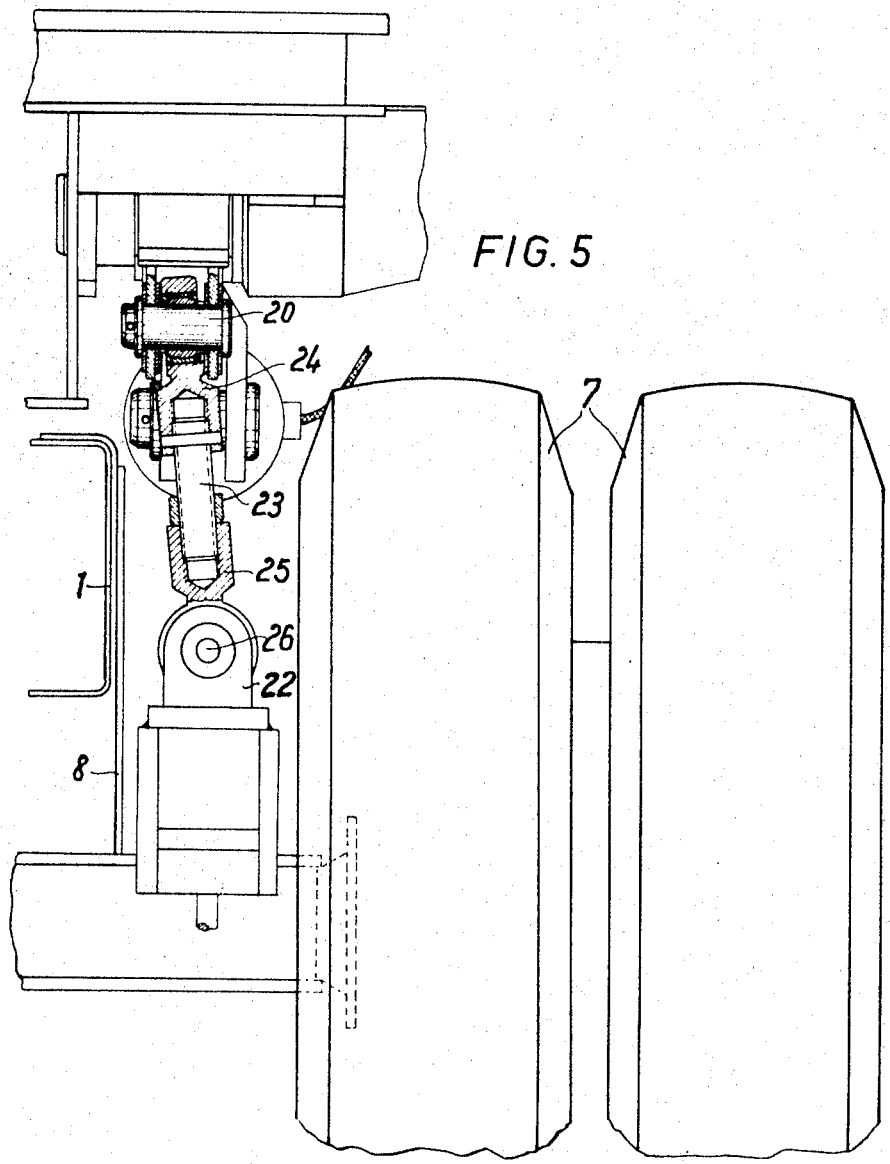
FIG. 5 is a section taken along the line V—V of FIG. 2 but on a larger scale than that of FIG. 2.

The reinforcing frame 2 has at both sides thereof journalled angle levers with axes transverse to the direction of driving. Of each two angle levers located on one vehicle side, longer legs 18, 19 extend toward the front and rear respectively. At their ends and by means of joint bolts 20 which are parallel to the bolts 17 there are journalled stilts or link members 21 the lower ends of which are connected to caps 22. These caps are connected to the wheel axles 4, 5 and have openings engaged by the ends of the spring packets 3, said ends resting on the plates 10. Each of the stilts 21 consists of a bar 23 provided with a thread (FIG. 5) and comprises one upper and power connecting head each. These heads form nuts for the threaded bar 23 so that the stilts are adjustable as to their length. The lower head piece 25 is connected to cap 22 by means of a joint bolt 26, said cap extending in the longitudinal direction of the vehicle so that the stilt as shown in FIG. 5 can be adjusted with a common inclination. This will also be made possible by the fact that the head piece 24 is journalled on the joint bolt 20 through the intervention of a ball cup. In order to permit the stilt ot incline relative to cap 22 in the longitudinal direction of the vehicle, the journalling of the lower tilted heads 25 on axis 26 is effected through the intervention of a ball cup not shown.

The other legs 27, 28 of the angle lever are shorter than the legs 18, 19 and are directed downwardly from bolt 17. Journalled on leg 27 by means of a joint bolt 30 extending parallel to bolt 17 there is the cylinder 29 of a hydraulic displacement device. On leg 28 of the other angle lever there is by means of a joint bolt 30 journalled the piston rod of a double-acting piston 31 which is guided in the cylinder 29. At both ends of the cylinder chamber there are provided connecting bores 32, 33 for the bypass conduit in which a shut-off valve is located.

This is clearly visible from FIG. 6 which shows the cylinders 29 with pistons 31 located at both sides of the vehicle. The bypass conduits 34 are connected to the connecting bores 32, 33 through the intervention of yieldable conduit pieces 35 so as to permit the cylinder 29 to move freely. The shut-off valves 36 are located in the bypass conduits 34. Each of the two connecting conduits 35 is through a conduit 37 communicating with a common pressure line 38. A hydro-accumulator 39 is connected to the two conduits 37 which also contain shut-off valves 40 coupled with valves 36 through a link system 41 in such a way that both valves will be opened and closed simultaneously.

Figure 4:
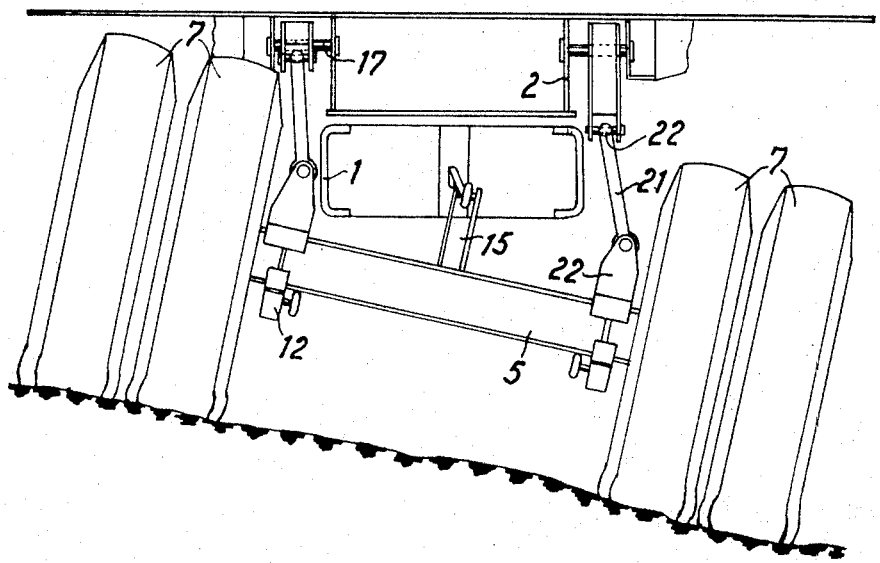
FIG. 4 is a rear view similar to that of FIG. 1 but pertaining to the position of the axles illustrated in FIG. 3.

When the vehicle moves in the street or over a terrain, valves 36 are open. Consequently, the angle levers 18, 27 and 19, 28 are not prevented by the hydraulic displacement devices 29, 31 from oscillating independently of each other about the joint bolts 17. It will be appreciated that in view of the displacement of piston 31 within the cylinder 29 inherent to the oscillations, the liquid displaced from the cylinder chamber at one piston side flows without impediment through bypass lines 34 into the cylinder chamber on the other side of the piston. The wheel axles 4 and 5, therefore, oscillate in conformity with the guidance by the links 11 tnd 14 while adapting themselves to the unevenness of the ground in upward or downward direction. In this connection, the vehicle frame 1 rests by means of two spring packets 3 uniformly upon the two axles, because the spring packets are adapted freely to adjust themselves about the axis of the transverse axle 9. In this connection, as shown in FIG. 4, also a certain transverse inclination of the wheel axles 4, 5 is possible. This is due to the yieldability of the spring leaves which are also adapted to absorb a certain torsion as well as a corresponding spatial journalling of links 11, 14 on the link bolts 12, 13, 15, 16. Also the above mentioned connection of the stilts 21 on one hand to the angle levers and on the other hand to the caps mounted on the wheel axles by means of ball cups, makes possible the transverse inclination of the wheel axles while avoiding jamming.

Figure 3:
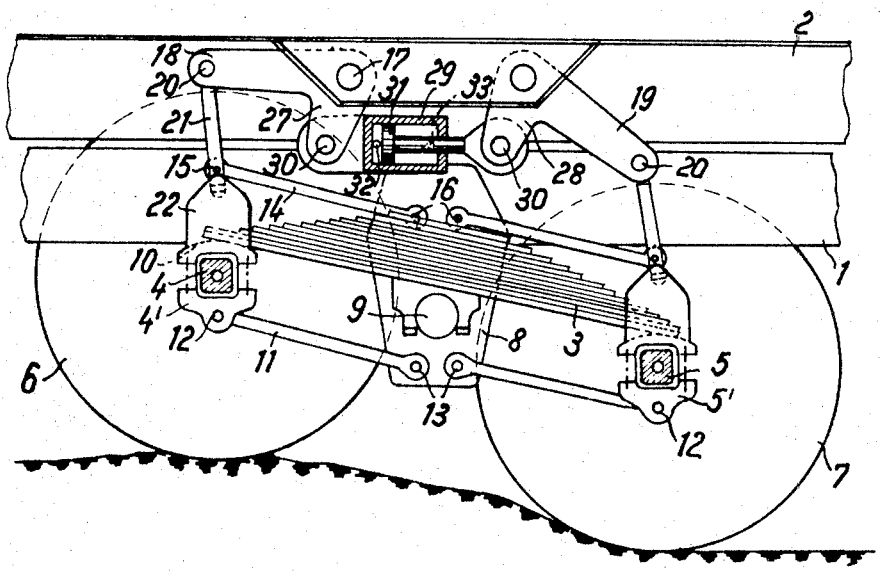
FIG. 3 illustrates a corresponding section showing the operation of the device when operating on a terrain in which the two axles are at a different level.

When it is desired to block the springs for purposes of operating the crane, the bypass conduits 34 are interrupted by means of the valves 36 while at the same time the valves 40 are closed. Consequently, the pistons 31 cannot be displaced within the cylinders 29, and the legs 27, 28 are by means of the thus blocked hydraulic displacement device 29, 31 acting in a manner of a bar, connected in such a way that the spacing between the joint bolts 38 remains unchanged. The two angle levers 18, 19 on each vehicle side, therefore, automatically carry out simultaneous tilting movements. As a result thereof, when the axle 4 is tilted upwardly as a result of a pivoting movement necessary due to the respective terrain, the axle 5 must automatically oscillate in a corresponding manner in downward direction as is illustrated in FIG. 3. Consequently, the angle levers coupled to each other by the blocked displacement device 29, 31 act upon the two wheel axles in cooperation with the links 11, 14 and the stilt 21 in the manner of a rigid oscillating device which interconnects the two axles and is journalled on the vehicle frame. The support of the load by the wheel axles 4, 5 is effected non-yieldably in view of the above mentioned blocking. The spring packets 3 will automatically adjust themselves in conformity with the respective height of the wheel axles 4, 5.

As will be evident from the above, the spring blocking according to the invention brings about the advantage that an equalization of the forces is effected between the two wheel axles whereby an overload of one axle will be prevented when passing over uneven terrain. In contrast hereto, with heretofore known crane supporting vehicles having double axles, the spring was blocked by a total of four hydraulic cylinders of which each two cylinders act upon an axle so that during the blocking there will not be obtained a compensating rocker effect and, consequently, the individual axles had to be dimensioned for a correspondingly high stress. Over this heretofore known design the present invention has the further advantage that a greater flexibility will be obtained with regard to the arrangement of the hydraulic cylinders so that a considerable space saving will be obtained in the space between the vehicle wheels and the vehicle frame.

Figure 2:
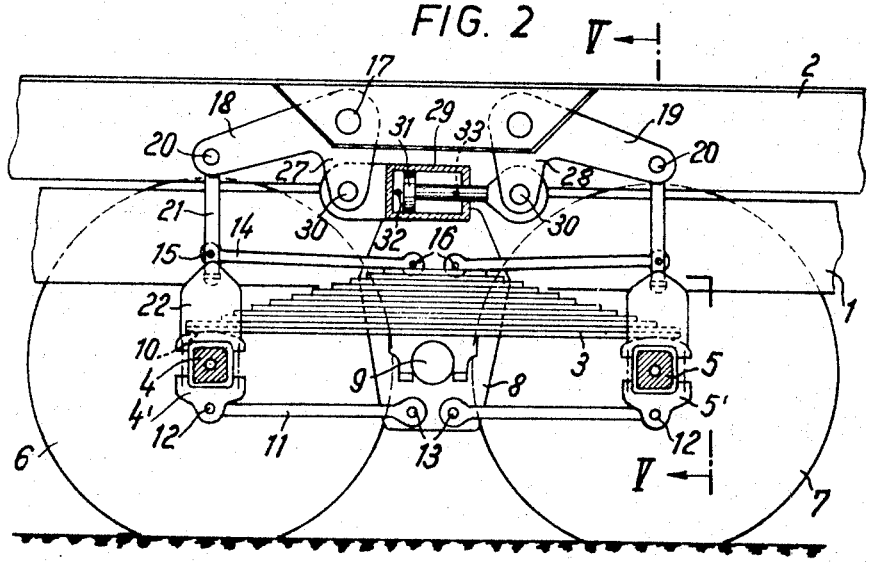
FIG. 2 is a section taken along the line II—II of FIG. 1 in the normal position of the two wheel axles within the range of the crane structure.

Finally, FIG. 7 shows the legs 27, 28 interconnected by the hydraulic displacement device 29, 31 which legs pertain to the two-angle levers. FIG. 7 shows that legs 27, 28 of the angle levers, which legs are connected by the hydraulic displacement device 29, 31, can extend from the joint bolts 17 upwardly instead of downwardly while the cylinder 29 is located correspondingly further upwardly. This may be of importance for exploiting the available space. In this instance the piston rod is by the respective load component, in contrast to the arrangement of FIG. 2, not subjected to pull but to pressure.

It is, of course, to be understood that the present invention is, by no means, limited to the particular constructions shown in the drawings but also comprises any modifications within the scope of the appended claims.

What I claim is:

1. A vehicle structure for supporting a crane, which includes: frame means, two pairs of wheels respectively arranged on opposite sides of said frame means, two axles supported by said two pairs of wheels, a plurality of spring means respectively associated with said two pairs of wheels and interposed between said axles and said frame means for resting said frame means on said axles, and two hydraulically operably spring blocking devices respectively associated with said two pairs of wheels and operable selectively to permit relative movement of the wheels of the respective pair of wheels independently with regard to each other and to link the wheels of the respective pair of wheels positively to each other to thereby substantially block the respective spring means pertaining thereto, each of said blocking devices including a hydraulically operable cylinder-piston system with a movable cylinder and a movable piston and also including a linkage system having lever means each pivotally supported by said frame means above said spring means and respectively pivotally connected to said cylinder and said piston, link members operatively connected pivotally between said lever means and said axles, and a parallelogram system included with said linkage system operatively connected to said lever means by said link members and to said axles and also including further link means in pairs above and below said axles for forming said parallelogram system.

2. A vehicle structure for supporting a crane, which includes: frame means, two pairs of wheels respectively arranged on opposite sides of said frame means, two axles supported by said two pairs of wheels, a plurality of spring means respectively associated with said two pairs of wheels and interposed between said axles and said frame means for resting said frame means on said axles, and two hydraulically operable spring blocking devices respectively associated with said two pairs of wheels and operable selectively to permit relative movement of the wheels of the respective pair of wheels independently with regard to each other and to link the wheels of the respective pair of wheels positively to each other to thereby substantially block the respective spring means pertaining thereto, each of said blocking devices including a hydraulically operable cylinder-piston system with a movable cylinder and a movable piston and also including a linkage system having lever means respectively pivotally connected to said cylinder and said piston and operatively connected to said axles, said linkage system also including link means forming a parallelogram system operatively connected to said lever means and said axles, each cylinder-piston system comprising conduit means leading from the interior of one end portion of the cylinder to the interior of the other end portion of the same cylinder, and shut-off valve means interposed in said conduit means for selectively interrupting and establishing communication between said cylinder end portions.

3. An arrangement according to claim 1, in which a transverse axis means is provided between said two axles, said spring means being carried by said parallelogram system for free turning movement with respect to said transverse axis means, said lever means each including a short arm portion connected to said cylinder and said piston respectively and a long arm portion pivotally connected to said link members, said link means of said parallelogram system including four links each having one end pivotally supported by said frame means and having opposite pivotal connection in said parallelogram system in pairs at location to said link members above said two axles and in pairs at location below said two axles.

References Cited

UNITED STATES PATENTS 2,755,097  7/1956  Elconin _____ 280—104.5

FOREIGN PATENTS 503,441    4/1939  Great Britain.
946,412    8/1956  Germany.
1,827,700  3/1961  Germany.

PHILIP GOODMAN, Primary Examiner.

U.S. Cl. X.R.

267—31